United States Patent Office 3,162,208
Patented Dec. 22, 1964

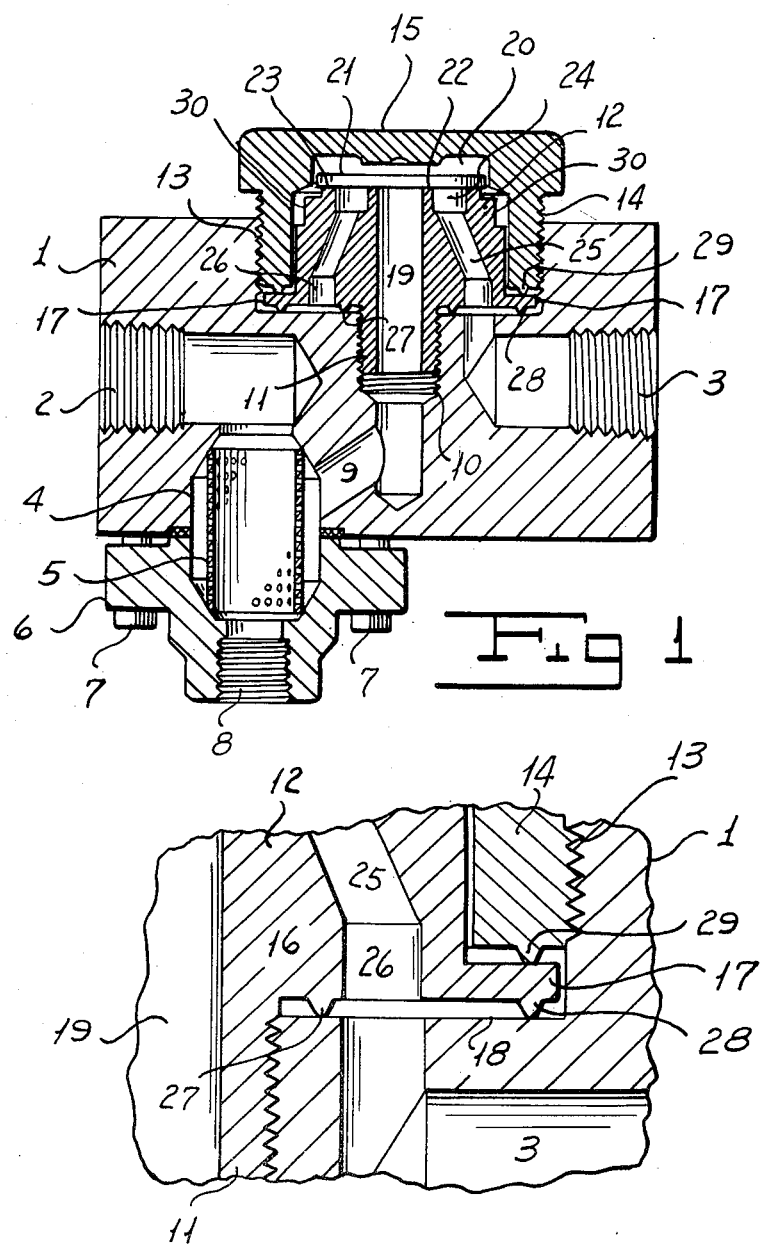

3,162,208
THERMODYNAMIC TRAP
Paul C. Curatola, Bethlehem, Pa., assignor to Sarco Company, Inc., New York, N.Y., a corporation of New York
Filed Nov. 30, 1961, Ser. No. 156,052
15 Claims. (Cl. 137—183)

This invention is a thermodynamic trap which functions, generally speaking, in the same manner as the trap of Midgette Patent No. 2,817,353, dated December 24, 1957, but which embodies numerous features of construction which render its use more universal from a practical standpoint.

Thermodynamic traps have long been known and are widely used. Their primary function is the proper scavenging of steam systems of air and condensate and they generally operate periodically to maintain such systems free from accumulations thereof. They are used in systems to handle widely different steam pressures, some of which are very high.

To provide for certain characteristics of these traps, it is necessary in the manufacture thereof to make them from a plurality of parts which must be so assembled that there is practically no leakage at the joints of the assembly. In the past it has been the practice to seal such joints through the employment of gaskets of various kinds but experience has shown that no matter what type of gasket is employed, it cannot be depended upon to eliminate leakage. Some gaskets may for a time hold the pressures, but after a relatively short period they break down or otherwise permit lekaage at one or more points because of the sonic speeds of the steam passing therethrough, particularly in high pressure systems. The flow of steam at such speeds through a trap has a pronounced destructive effect upon any gasket that can be employed, due, inter alia, to scouring or wire drawing action or to natural break down and deterioration of the gasket under the pressures handled by the traps.

From the very beginning of the history of traps, these facts have been recognized and there have been over the years endless attempts made by the manufacturers of such traps to provide effective seals between the trap parts, but without any actual solution of the problem. Manufacturers have undertaken highly extensive expedients to the end stated and practically every known type of gasket has been employed or tested but without avail.

The present invention is a complete solution of the problem from the standpoint of a "tight" trap, i.e., one which will not leak at the joints between the several parts thereof.

This I have been able to accomplish by the use of sealing ridges i.e., sealing ridge elements, disposed linearly about each joint so as to completely surround the fluid passages through which the leakage might occur. These sealing ridges are preferably so arranged that each member rigidly attached to the body of the trap functions to effect its individual seal between it and the portion of the trap to which it is attached during the assembly of the parts. Thus each individual element, as it is assembled, serves to seal itself so that, when the entire assembly is complete, the sealing operation is complete. These results are made possible by a novel arrangement of parts hereinafter more fully described. With this construction thorough sealing and permanent seals are effected by the mere assembly of the parts and this without the use of any gasket or gasketing materials in those portions of the trap where leakage would detrimentally affect the functioning of the trap.

Another aspect of this invention is directed to the installation problems encountered in commercial use. Because of the stresses, strains, erosion and other problems met with in traps, it has been almost universally the practice to make all parts of the trap with which the steam comes into contact of extremely hard metal, generally stainless steel. Prior traps have generally been provided at their inlet and outlet passages with threaded connections to permit of their connection into the steam lines. There are, however, many cases where it would be much more convenient and economical to weld them into the line, but, as is well known, it is extremely difficult to weld stainless steel of the hardenable types into the line and consequently there has long been well recognized need for a trap that can be so welded and would still be sufficiently durable to meet practical requirements.

The present invention accomplishes this result. It is made possible by enclosing the trap seat insert and the cooperating sealing disk of the requisite hardness and durability, within a housing or trap body of relatively mild or softer metal which may be welded or otherwise worked to incorporate the same into the steam lines.

Another important feature of the invention is that the trap thereof is so constituted that all parts of the same which are subjected to the flow of liquid therethrough, more particularly the trap seat member and cooperating disk may be readily replaced without removal of the trap from the line. In practice this can be accomplished according to this invention by simply removing the cap which covers the sealing disk and then unscrewing the trap seat member which is thus made removable from the trap body.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

FIG. 1 is a longitudinal vertical section through a trap embodying the present invention.

FIG. 2 shows in section, an enlarged fragmental portion of the trap of FIG. 1, so as to more clearly illustrate the manner in which the seals between the respective parts are effected.

Figure 3:
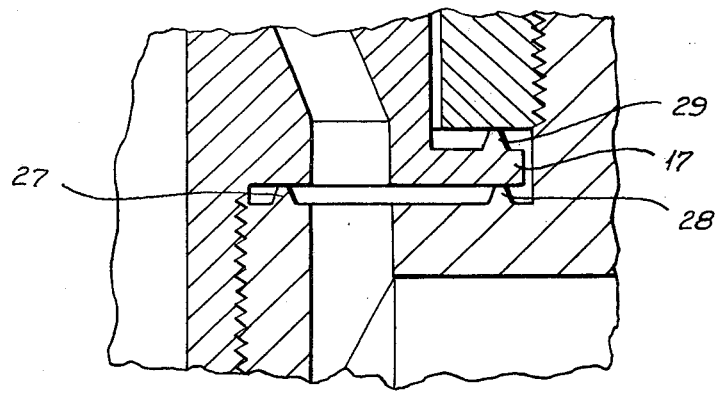
FIG. 3 is a view corresponding to FIG. 2, but showing the sealing ridges positioned on the opposite parts than as shown in FIG. 2.

Referring to the drawings, 1 designates the housing of the trap which, in accordance with this invention, may be fashioned from bar stock, such, e.g., but without limitation, as chrome steel, molybdenum steel, hot or cold rolled steel or the like. These materials are readily machineable and weldable and tapped holes may be easily formed therein.

The housing has an inlet port 2 and an outlet port 3. The inlet port leads to a sump 4 containing a strainer 5 which may be of the screen or perforated sheet metal type. It is held in place by a plate 6 secured to the housing by screws 7. The plate is provided at its bottom with a tapped opening 8 into which a blow-off valve may be screwed to permit the screen to be freed from accumulations as and when desired. A passage 9 leads from the sump to a threaded socket 10 and into this socket is adapted to be screwed the threaded shank 11 of a seat insert 12. This seat insert is received within a recess 13, the circumferential wall of which is threaded to cooperate with the threaded skirt 14 of a cap 15.

The seat insert 12 is of novel and unique construction. Its main portion or body 16 carries the depending threaded shank 11 and it is provided at the base of its body 16 with a radial flange 17 which projects outwardly to lie between the flat surface 18 at the base of the recess and the lower edge of the skirt 14 of the cap 15 as shown best in FIG. 2. A central passage 19 extends through the valve seat member to a chamber 20 in which is positioned a sealing disk 21 overlying an inlet seat 22 which directly surrounds the passage 19 and an outlet seat 23 which is radially spaced from the inlet seat 22. Intermediate said seats the upper surface of the seat insert is provided with an upper annular channel 24 communicating, through one or more passages 25, with a lower annular channel 26 which is in communication with the port 3 of the trap. The foregoing channels and passages in the trap, together with the valve seats 22 and 23 and the disk 21, provide the means whereby this trap is adapted to carry out periodic evacuation of air and condensate from the steam line in which the trap is incorporated, in a manner fully explained in the Midgette patent hereinbefore referred to and which patent is hereby incorporated by reference in this disclosure. The mode of operation of the present trap in this connection therefore forms no part of the present invention except insofar as the structure is necessary to carry out the fundamental purposes of the trap.

The seat insert 12 constitutes an important feature of this invention. It is made from hard, wear-resisting material, e.g., stainless steel, Stellite, carballoy, or the like, which has a high degree of hardness and corrosion resistance and the same is true of the sealing disk 21, so that these parts, which constitute the actual flow controlling elements of the trap, will withstand the wear and tear to which such parts are subjected, particularly when the trap is installed in high pressure steam systems.

The provision of the seat insert 12 with the radial flange 17 makes it possible to produce a leak-proof trap without gaskets. To this end, the under surface of the body 16 of the insert is provided, intermediate the lower channel 26 and the threaded joint between the shank 11 and the housing 1, with a depending sealing ridge 27 while the under side of the radial flange 17 is provided with a similar sealing ridge 28 located between the lower channel 26 and the threaded joint between the skirt 14 of the cap and the housing 1. A similar sealing ridge 29 is formed on the lower edge of the skirt 14. If desired, the sealing ridge 29 may be formed on the flange 17 and one or both of the ridges 27 and 28 may be positioned on the housing 1.

With the foregoing combination and relation of parts, the following procedure is made possible.

In assembling the parts of the trap, the seat insert is first screwed down tightly into the threaded socket 10 of the housing. This may be accomplished through the use of a wrench applied to oppositely disposed flat surfaces 30 formed at the upper portion of the insert. As the insert is screwed down, the sealing ridge 27 is brought to bear upon the surface 18 of the housing with sufficient pressure on the latter to form a hermetic seal between the threaded connection with the housing and the lower channel 26.

This seal having been accomplished during the mounting of the seat insert in the housing, the cap 15 is next screwed into the recess 13. This cap may conveniently be provided with a hexagonal portion on its upper part to be engaged by a wrench. As the cap is screwed downwardly, the sealing ridge 29 of the cap skirt 14 is caused to bear upon the upper surface of the seat insert flange 17 and, in turn, force the sealing ridge 28 on the lower surface of said flange to bear against the surface 18 of the housing. The flange 17 is sufficiently resilient or flexible so that the force applied in screwing down the cap will result in impervious seals between the cap skirt and the flange and between the flange and the housing 1.

A screw connection has been shown between the cap and the housing although in practice the skirt may be unthreaded and the upper portion of the cap may be in the form of a plate adapted to be bolted firmly to the housing to accomplish the results stated. Also, instead of forming a sealing ridge 29 on the flat lower edge of the cap skirt, the lower edge of the skirt may be tapered to form the sealing ridge.

In any event the tightening of the cap into place will form the two hermetic seals at the ridges 28 and 29. The seal produced by the ridge 28 will preclude leakage from the lower channel 26, across the surface 18 and outwardly through the threaded joint between the cap and housing. The seal produced by the ridge 29 will preclude leakage from the chamber 20 downwardly around the exterior of the seat insert, outwardly across the upper surface of the flange 17 and out through said threaded joint.

In the manner stated, the assembly of each of the parts referred to will result in its own individual seal as it is brought into place and all of said seals, collectively, will hermetically seal the joints between said parts against leakage from the fluid passages through the trap. By making the seat insert of very hard materials and the housing and cap of softer materials, the formation of the said hermetic seals is effectually accomplished.

In order that this may be so, the several sealing ridges are preferably made with flat or substantially flat surface engaging edges, so as to engage with coacting surfaces in the form of relatively narrow annular bands. These edges should be wide enough to prevent "galling" or welding of the coacting metal surfaces by the extreme contact pressures to which they may be subjected, but they should not be so wide as to make impossible sufficient compression of the metal to conform to irregularities of the mating surfaces, when subjected to the available force that can be exerted upon said ridges. In other words, the width of the bands of contact is with due regard to the modulus of elasticity of the parts which are thus brought into contact to form the seals.

Without any intention to limit the invention in this respect, edges in the neighborhood of $\frac{1}{32}''$ width have been found to function with complete satisfaction and efficiency when they are formed on stainless steel valve inserts and act against cold rolled steel and the same is true with respect to the sealing ridge 29 on the cap skirt.

It will thus appear that the valve seat insert, constructed as described and functioning in conjunction with the sealing ridges in the manner stated, forms an important aspect of this invention and makes it possible for each of the separate elements to individually form their own hermetic seals at the joints between them and the trap housing.

By utilizing bar stock of relatively mild character or hardness, as compared to the valve seat insert, the housing is well adapted to be provided with welded connections between the trap and the pipe lines of the steam system in which it is to be installed or, if desired, it can be readily drilled and tapped to receive plates to which said pipe lines have been welded or otherwise affixed.

The trap of this invention may be economically manufactured according to conventional machining practice. No close tolerances or lapping of the parts are required in producing the seals referred to. In the event that it become desirable for any reason to remove or replace the valve seat insert or change the thermodynamic characteristics thereof, this can be readily accomplished by merely removing the cap 15 and then screwing out the valve seat insert to permit the making of such changes. It is not necessary to disconnect the trap from the steam system. Furthermore, the sealing ridges referred to produce hermetic seals in the initial assembly of the parts will reproduce such seals if for any reason these parts are dismantled. These results are obtained without the use of any gaskets and in a simple, efficient and effective manner.

The foregoing detailed description sets forth the invention in its preferred practical forms, but the invention is to be understood as fully commensurate with the appended claims.

Having thus fully described the invention, what I claim as new and desire to secure by Letters Patent is:

1. A thermodynamic trap comprising:
   (a) a metal trap housing having fluid inlet and outlet ducts,
   (b) a metal valve seat insert removably positioned within the housing and provided with inlet and outlet flow passages communicating with the respective fluid inlet and outlet ducts of the housing, said seat insert being provided with an integral peripheral flange,
   (c) a removable metal cap secured to the housing for securing said seat insert in the housing and forming with the housing a joint,
   (d) a metal sealing ridge element interposed between the inlet and outlet passages of the seat insert and having metal-to-metal sealing relation between the housing and the seat insert to form therewith a hermetic seal between said passages,
   (e) another metal sealing ridge element interposed between said flange and housing peripherally of both of said inlet and outlet passages collectively and between said passages and the joint between the cap and the housing and having metal-to-metal sealing relation with both the flange and the housing to form therewith a hermetic seal between said passages and the joint between the cap and the housing, and
   (f) still another metal sealing ridge element interposed between said cap and flange and having metal-to-metal sealing relation with both of them to form an additional hermetic seal against the escape of pressure through the joint between the cap and the housing,
   all of said metal sealing ridge elements having substantially flat sealing edges sufficiently narrow to conform under pressure to irregularities in the metal surfaces of the trap with which they engage.

2. A thermodynamic trap according to claim 1, wherein the seat insert has threaded connection with the housing, said threaded connection being screwed sufficiently tight to hold the sealing ridge element between the passages to said hermetic seal and wherein the cap has a threaded connection with the housing and is screwed sufficiently tight to force the other sealing ridge elements to make hermetic seals between the cap and the flange and between the flange and the housing.

3. A thermodynamic trap according to claim 1, wherein the peripheral flange of the valve seat member is flexible under pressure applied thereto by the cap.

4. A thermodynamic trap comprising:
   (a) a trap housing member having fluid inlet and outlet ports,
   (b) a valve seat insert member removably positioned within the housing member and provided with inlet and outlet passages and a radially projecting peripheral flange integral therewith,
   (c) a removable cap secured to the housing member and bearing against said flange for detachably securing the valve seat insert member to the housing member with the inlet and outlet passages of the valve insert member in communication with the respective fluid inlet and outlet ports of said housing member,
   (d) a sealing ridge between said members intermediate said inlet and outlet passages to form an impervious seal between said passages,
   (e) another sealing ridge between the flange of the valve seat insert member and the housing member to form therebetween a hermetic seal around said inlet and outlet passages collectively, and
   (f) still another sealing ridge between the flange of the valve seat insert member and the cap to form an additional hermetic seal against the escape of pressure through the joint between them,
   (g) all of said sealing ridges having substantially flat narrow sealing edges to prevent galling of the surfaces with which they engage.

5. A thermodynamic trap according to claim 4, wherein the valve seat insert member is of relatively hard material not adapted for welding and the trap housing member is of readily weldable material.

6. A trap according to claim 5, wherein the valve seat insert member is of stainless steel and the housing member is of softer bar stock.

7. A thermodynamic trap according to claim 4, wherein said peripheral flange is flexible under pressure applied thereto by the cap.

8. A thermodynamic trap according to claim 4, wherein at least one of said sealing ridges is integral with the housing member.

9. A thermodynamic trap according to claim 4, wherein at least one of said sealing ridges is integral with the cap.

10. A thermodynamic trap according to claim 4, wherein all parts of the trap are of metal.

11. A thermodynamic trap comprising:
    (a) a trap housing member having fluid inlet and outlet ports,
    (b) a valve seat insert member removably positioned within the housing member and provided with inlet and outlet passages communicating with the respective fluid inlet and outlet ports of said housing member, said seat insert member being provided with a radially projecting peripheral flange integral therewith,
    (c) a removable cap secured to the housing member and bearing against said flange for securing said seat insert member in the housing member and forming with the housing member a joint,
    (d) a sealing ridge on one of said members intermediate said inlet and outlet passages and bearing against an opposed surface on the other member to form therewith a hermetic seal between said passages,
    (e) another sealing ridge between one side of said flange and an opposed surface of the housing member and integral with one of them to form therebetween a hermetic seal around the inlet and outlet passages collectively and between said passages and the joint between the cap and the housing member, and
    (f) still another sealing ridge between the cap and said flange and integral with one of them to form an additional hermetic seal against the escape of pressure through said joint,
    (g) all of said sealing ridges having substantially flat narrow sealing edges to prevent galling of the surfaces with which they engage.

12. A thermodynamic trap according to claim 11, wherein all parts of the trap are of metal.

13. A thermodynamic trap comprising:
    (a) a trap housing having fluid inlet and outlet ports,
    (b) a valve seat insert removably positioned within the housing and provided with inlet and outlet flow passages communicating with the respective fluid inlet and outlet ports of said housing, said seat insert being provided with a peripheral flange integral therewith,
    (c) a removable cap secured to the housing and bearing against said flange for securing said seat insert in the housing and forming with the housing a joint,
    (d) a sealing ridge on said insert intermediate the inlet and outlet passages thereof and bearing against an opposed surface of the housing to form therewith a hermetic seal between said passages,
    (e) another sealing ridge on one side of said flange bearing on an opposed surface of the housing to form therewith a hermetic seal around the inlet and outlet passages collectively and between said passages and the joint between the cap and the housing, and (f) still another sealing ridge on the cap bearing against said flange to form an additional hermetic seal against the escape of pressure through said joint, (g) all of said sealing ridges having substantially flat narrow sealing edges to prevent galling of the surfaces with which they engage.

14. A thermodynamic trap according to claim 13, wherein the seat insert has threaded connection with the housing whereby the tightening of such connection forces the sealing ridge between the passages to a hermetic seal and wherein the cap has threaded connection with the housing to force said other sealing ridges to make hermetic seals between the cap and the flange and between the flange and the housing.

15. A thermodynamic trap according to claim 13, wherein the sealing ridges which are intermediate the inlet and outlet passages are held to the hermetic seal by a threaded connection between the valve seat insert and the housing, while the sealing ridges which are around the inlet and outlet passages and which seal the joint between the cap and the housing are held to their respective hermetic seals by pressure applied thereto by the cap.

References Cited in the file of this patent

UNITED STATES PATENTS

| | | |
|---|---|---|
| 2,622,886 | McKee | Dec. 23, 1952 |
| 2,631,612 | Buescher | Mar. 17, 1953 |
| 2,645,449 | Gulick | July 14, 1953 |
| 2,951,496 | Yarnall | Sept. 6, 1960 |

FOREIGN PATENTS

| | | |
|---|---|---|
| 827,989 | Great Britain | Feb. 10, 1960 |